United States Patent Office 3,149,946
Patented Sept. 22, 1964

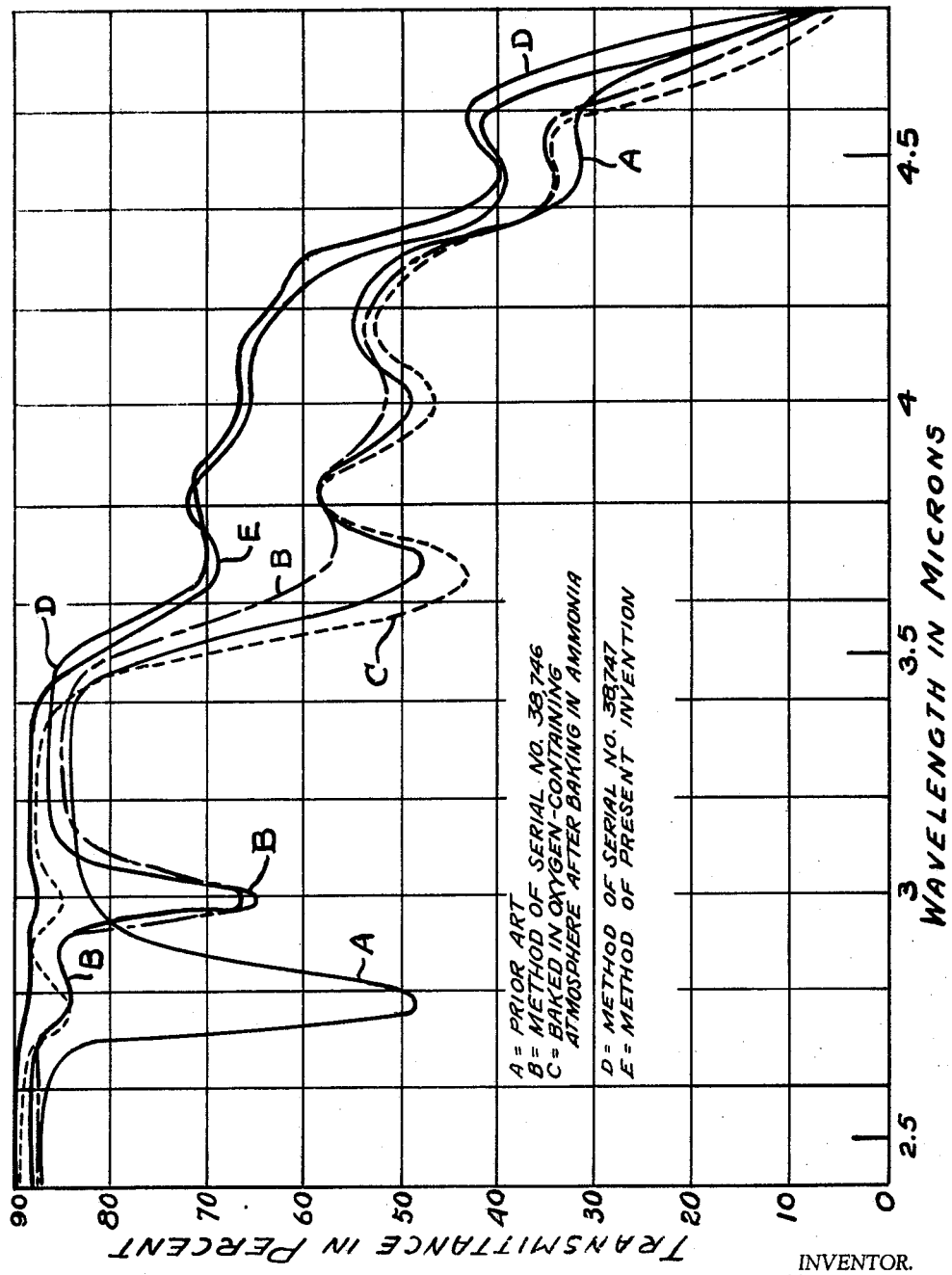

3,149,946
METHOD OF IMPROVING THE INFRARED TRANS-
MITTANCE OF HIGH SILICA GLASS
Thomas H. Elmer, Corning, N.Y., assignor to Corning
Glass Works, Corning, N.Y., a corporation of New
York
Filed June 27, 1960, Ser. No. 39,060
8 Claims. (Cl. 65—32)

This invention relates to glasses of the type disclosed in Patents Nos. 2,106,744 and 2,221,709, and particularly to a method of improving the infrared transmittance of such glasses.

According to such patents, an article composed of a glass containing over 94% silica can be produced by melting and shaping a particularly easily meltable borosilicate glass, heat treating the glass to cause it to phase separate, and extracting therefrom the soluble, non-siliceous constituents of one phase by leaching to leave a highly siliceous structure retaining its original shape and having a multiplicity of intercommunicating submicroscopic pores, thereafter consolidating the porous glass to a non-porous condition by heating.

Articles having a wide variety of sizes and shapes can be easily made by such method and can be utilized under conditions where they are subjected to much higher temperatures than conventional glass bodies which are merely formed from molten glass. While such high silica glasses are useful for a wide variety of purposes, its use for some purposes, such as nose cones for missiles or lenses for infrared optic systems, is not entirely satisfactory because of the substantial absorption by the glass of radiation having a wave length of about 2.7 microns and higher.

The principal object of this invention is to improve the infrared transmission of high silica glasses.

Another object of this invention is to provide a method of producing high silica glass with increased annealing points.

The accompanying drawing illustrates the improvement in the infrared transmittance of high silica glass treated in accordance with my new method.

I have found that the principal object of my invention can be achieved by treating a glass body in the porous condition produced in accordance with the above-mentioned patents, such glass being known in the trade by the generic name of "96% silica glass," by subjecting it to a temperature of between 900–1050° C. in an atmosphere consisting essentially of ammonia gas, and its dissociation products, nitrogen and hydrogen, subjecting it to further treatment at a temperature of 900° C.–1050° C. in an anhydrous oxidizing atmosphere, and thereafter consolidating the porous glass body by heating it to a temperature of at least 1250° C. in an anhydrous atmosphere. Although baking in the ammonia-containing atmosphere prior to consolidation substantially improves the infrared transmittance of the glass, it introduces an absorption band at about 2.95 microns wave length which can be eliminated by baking the ammonia-treated porous glass in an anhydrous, oxygen-containing atmosphere such as air, prior to consolidating the glass. Furthermore, I have also found that porous glass bodies which have been heat treated and releached in a leaching solution to reduce the boric oxide content of the glass, as described in another application filed by me of even date herewith, Serial No. 38,747, when subsequently treated in accordance with the present method produces an even greater increase in the infrared transmittance because of the reduction of the absorption bands at about 3.6 and about 3.95 microns wave length.

The drawing illustrates the improvement in the infrared transmittance of glasses made according to my invention by showing the relationship of the amount of energy transmitted through a wall of about 1 millimeter thickness for wave length in the infrared region. In the drawing, curve A is illustrative of the transmittance of a 96% silica glass made in accordance with the above-mentioned patents and fired in a vacuum as is shown in Patent No. 2,505,001, and shows the strong absorption of the glass of radiations having wave lengths of 2.72 microns. Curve B illustrates the transmittance of a similar piece of glass which has been baked in an ammonia-containing atmosphere according to the method set forth in my copending application Serial No. 38,746, of even date herewith, prior to its consolidation in a vacuum. Curve C illustrates the transmission of a similar piece of glass which has been baked in an oxygen-containing atmosphere after being baked in the ammonia-containing atmosphere prior to its consolidation in a vacuum in accordance with the method of the present invention. Curve D illustrates a further embodiment of my invention in which a 1 millimeter thick piece of 96% silica glass has been prepared according to the method disclosed in another application, Serial No. 38,747, filed by me of even date herewith so as to reduce the boric oxide content of the glass to a level of less than about 1.5% and thereafter treated in accordance with my present invention by subjecting it to a temperature of about 850° to 1050° C. in an ammonia-containing atmosphere prior to its consolidation in a vacuum. Curve E illustrates the transmittance of a glass prepared in accordance with the same method that is utilized for the glass of curve D with the exception that it was additionally fired in an oxygen-containing atmosphere after treatment in the ammonia-containing atmosphere prior to its consolidation in a vacuum.

In practicing my invention, the article used as the initial stock material in my improved process is fabricated in the usual manner from a glass consisting essentially of $SiO_2$, $B_2O_3$, and alkali oxide, the amount of each being governed by considerations set forth in the above-mentioned patents. In these glasses alumina may be present in small amounts and its presence in amounts up to 4% in glasses of low silica content located near the center of the field defined in such patents is advantageous in facilitating the subsequent leaching of the glass.

The article is subjected to a heat treatment which comprises heating the glass at a temperature between about 525° and 600° C. for a time necessary to cause the required change in structure. As a result of the heat treatment, the glass will become more or less completely separated or formed into two phases one of which is very rich in boric oxide and alkali metal oxide and is soluble in acids and the other of which is very rich in silica and is substantially insoluble in acids. In other words, a change has taken place in the structure of the glass so that the constituents other than silica are for the most part soluble in acids and may be extracted thereby.

The previous thermal history of a glass has a bearing upon the heat treatment which may be required for best results. Articles which are relatively thick receive some heat treatment in normal working and cooling and the additional heat treatment required may be different from that required by a thinner article which was cooled more quickly during manufacture. Hence the term "heat treatment" as used herein includes heat treatment during fabrication as well as any additional heat treatment following fabrication.

In order that the leaching step may be carried out with better facility, it is desirable to etch off the surface of the glass by immersing it for a few minutes in a dilute solution of hydrofluoric acid or in a hot 5% solution of sodium hydroxide.

The article is then rinsed and immersed in dilute hydrochloric, nitric, or sulfuric acid, the temperature of the bath being held preferably at or near its boiling point to obtain maximum speed of extraction. The progress of the extraction may be observed because the interface between the extracted and unextracted portions of the glass is visible.

After the acid treatment, the glass is washed to remove all traces of the soluble constituents which have been acted on by the acid. This is best accomplished by immersing the glass for several hours in hot, acidified water so as to expose all sides of the article to the washing action. The removal of the soluble phase leaves the silica phase as a rigid structure possessing the original shape of the article, but submicroscopically porous, the pores being filled with water. The article may thereafter be dried and in general will be substantially transparent, probably because the individual pores are too small to reflect light. Articles thus produced in which the pore size is sufficiently large will have light diffusing characteristics.

In the practice of the present process, the porous glass articles are advantageously subjected to an initial dehydration treatment for elimination of water loosely held within the pores. This dehydration is effected by heating the tubes at a temperature ranging from about 600°–850° C. Heating-up should be sufficiently slow to avoid fracture of the glass by too rapid drying.

The initially dehydrated tubes are then heated in an atmosphere consisting essentially of ammonia and its dissociation products, hydrogen and nitrogen, at a temperature ranging from about 900° C. to 1050° C. for a time of from about 1 hour to about 16 hours, preferably at 950° C. for 16 hours. Although use of such ammonia atmosphere can be begun at a temperature below 900° C., no particular advantage is derived thereby. The use of such ammonia atmosphere at temperatures above about 1050° C. is not particularly desirable, since consolidation of the porous glass already begins to take place to an appreciable extent at such temperature or cracks develop within the glass.

When the treatment with the ammonia gas has been accomplished in this manner, the porous glass can be consolidated by producing a vacuum within the furnace or merely replacing the ammonia gas with inert, anhydrous gases such as nitrogen, carbon monoxide, carbon dioxide, sulphur dioxide, helium, neon, and argon as is shown in Patents No. 2,505,001 and 2,612,727 and heating the glass to a temperature of about 1300°–1350° C., or the glass may be consolidated in air at about 1200°–1250° C.

The preferred method of practicing the broad scope of my method comprises placing a porous glass tube having a wall thickness of about 1.1 millimeters in a conventional furnace and preheating it in air to a temperature of about 750° C. The tubing is thereupon transferred to another furnace which has been preheated to 750° C. and which has had ammonia gas introduced therein; the atmosphere within the furnace consisting essentially of ammonia gas and its dissociation products, nitrogen and hydrogen. The tubing is thereupon heated at the furnace rate to a temperature of 950° C. and maintained at such temperature for 16 hours. During such time that the porous glass article is being treated in the ammonia atmosphere, ammonia gas is continually injected into the furnace at such a rate as to continually allow bleeding gas from the furnace atmosphere so that the thus exhausted gas contains a discernible amount of ammonia. The atmosphere is then exhausted to produce a vacuum of about 1 millimeter of mercury pressure therewithin and the temperature is raised to the consolidation temperature of at least 1300° C. with appropriate holds or soaking times of ½ hour at 900° C. and 1 hour each at 950° C., 1000° C., and 1050° C. The body is finally consolidated by holding it at the preferred consolidation temperature of 1350° C. for about ½ hour.

A modification of the above procedure which can be utilized to produce a body at a still higher infrared transmittance, by reducing the absorption of radiation with wave lengths of above 2.0 microns, comprises replacing the ammonia gas in the furnace atmosphere at the end of the ammonia-baking step with an oxidizing gas, such as air or oxygen, rather than producing a substantial vacuum therein, and then consolidating the glass by holding it at the preferred consolidation temperature of 1250° C. for about 20 minutes.

The embodiments of my invention which produces an article with an annealing point in excess of 1100° C. and also with the greater transmittance to infrared radiation, comprises treating a porous glass body containing less than about 1.5% $B_2O_3$, produced in accordance with the methods set forth in the above-mentioned copending application Ser. No. 38,747, to the herein described process. In such instance, my preferred method comprises heating a porous tube of such glass with a wall thickness of about 1.1 millimeters in a conventional furnace to a temperature of about 750° C. and transferring the tubing to another furnace which has been preheated to 750° C. and contains an atmosphere consisting essentially of ammonia gas and its dissociation products. The tubing is thereupon heated at a furnace rate to a temperature of about 950° C. and maintained at such temperature in the surrounding environment consisting essentially of ammonia and its dissociation products for 16 hours. The ammonia gas within the furnace is then replaced with an oxidizing gas, such as air or oxygen, and raised to the consolidation temperature of at least 1300° C. with appropriate holds or soaking times of 1 hour each at 950° C., 1000° C., and 1050° C.

The furnaces utilized for the heating steps of my process are of conventional type. Thus, the glass may be heated at temperatures of up to about 1050° C. in electric furnaces utilizing wire resistance heating elements of suitable metals such as Nichrome. The consolidation of the porous glass must be carried out in a furnace capable of maintaining temperatures of at least 1200°–1350° C. and, hence, a suitable furnace for such purpose comprises the so-called Globar-type utilizing silicon carbide or molybdenum disilicide heating elements.

As used hereinafter in the appended claims, "ammonia-atmosphere" includes an atmosphere containing ammonia and its dissociation products, hydrogen and nitrogen.

What is claimed is:

1. The method of improving the properties of a 96% silica glass article made by the consolidation of a high silica glass article containing throughout its mass a multiplicity of intercommunicating submicroscopic pores which consists of heating the porous glass body to a temperature of 900°–1050° C. in an atmosphere consisting essentially of ammonia and its dissociation products, subsequently heating the body to a temperature of 900°–1050° C. in an atmosphere consisting essentially of an oxidizing gas, and thereafter consolidating the thus treated glass to the non-porous condition.

2. The method of improving the properties of a 96% silica glass article made by the consolidation of a high silica glass article containing throughout its mass a plurality of intercommunicating submicroscopic pores which consists of heating the porous glass body in an atmosphere consisting essentially of ammonia and its dissociation products to a temperature of about 900°–1050° C. for at least 1 hour, subsequently heating the thus treated porous glass body to a temperature of 900°–1050° C. in an atmosphere consisting essentially of an oxygen-containing gas for at least 1 hour, and thereafter consolidating the porous class body to a nonporous condition.

3. The method of improving the properties of a 96% silica glass article made by the consolidation of a high silica glass article containing throughout its mass a plurality of intercommunicating submicroscopic pores and containing less than about 1.5% $B_2O_3$ which consists of heating the porous glass body to a temperature of 900°–1050° C. in an atmosphere consisting essentially of ammonia and its dissociation products for at least 1 hour, subsequently heating the thus treated porous glass body to a temperature of 900°–1050° C. in an atmosphere consisting essentially of an oxygen-containing gas for at least 1 hour, and thereafter consolidating the glass to the non-porous condition by heating it to between 1300° C. and 1350° C.

4. In the method of making a 96% silica glass article which comprises melting and shaping a borosilicate glass, heat treating the glass to cause it to phase separate and extracting therefrom soluble, non-siliceous constituents of one phase by leaching to leave a highly siliceous structure retaining its original shape and having a multiplicity of intercommunicating submicroscopic pores and thereafter consolidating the porous glass to a non-porous condition by heating, the improvement which comprises heating the porous glass body to a temperature of about 900°–1050° C. in an atmosphere consisting essentially of ammonia and its dissociation products, subsequently heating thus treated porous glass body in an atmosphere consisting essentially of an oxygen-containing gas to a temperature of 900°–1050° C., and thereafter consolidating the thus treated glass to the non-porous condition.

5. In the method of making a 96% silica glass article which comprises melting and shaping a borosilicate glass, heat-treating the glass to cause it to phase separate and extracting therefrom soluble, non-siliceous constituents of one phase by leaching to leave a highly siliceous structure retaining its original shape and having a multiplicity of intercommunicating submicroscopic pores and thereafter consolidating the porous glass to a non-porous condition by heating, the improvement which comprises heating the porous glass body to a temperature of about 900°–1050° C. in an atmosphere consisting essentially of ammonia and its dissociation products for at least 1 hour, subsequently heating the thus treated porous glass body in an atmosphere consisting essentially of an oxygen-containing gas to a temperature of 900°–1050° C. for at least 1 hour and thereafter consolidating the porous glass body to the non-porous condition.

6. In the method of making a 96% silica glass article which comprises melting and shaping a borosilicate glass, heat-treating the glass to cause it to phase separate and extracting therefrom soluble, non-siliceous constituents of one phase by leaching to leave a highly siliceous structure retaining its original shape and having a multiplicity of intercommunicating submicroscopic pores and thereafter consolidating the porous glass to a non-porous condition by heating, the improvement which comprises heating the porous glass body to a temperature of 750°–1050° C. for at least 1 hour, leaching the thus heat-treated porous glass body in an acid leach bath, heating the releached porous glass body to a temperature of 900°–1050° C. in an atmosphere consisting essentially of ammonia and its dissociation products for at least 1 hour, subsequently heating the thus treated porous glass body in an atmosphere consisting essentially of an oxygen-containing gas to a temperature of 900°–1050° C. for at least 1 hour, and thereafter consolidating the glass to the non-porous condition by heating it to between 1300° C. and 1350° C.

7. The method of claim 1 wherein the oxidizing gas is air.

8. The method of claim 4 wherein the oxygen-containing gas is air.

References Cited in the file of this patent
UNITED STATES PATENTS

| | | |
|---|---|---|
| 2,215,039 | Hood | Sept. 17, 1940 |
| 2,286,275 | Hood | June 16, 1942 |
| 2,303,756 | Norberg | Dec. 1, 1942 |
| 2,612,726 | Norberg | Oct. 7, 1952 |
| 2,612,727 | Norberg | Oct. 7, 1952 |